United States Patent
Pan et al.

(10) Patent No.: US 7,106,498 B2
(45) Date of Patent: Sep. 12, 2006

(54) BLUE-LIGHT GENERATING FEMTOSECOND WAVELENGTH-TUNABLE NON-COLLINEAR OPTICAL PARAMETRIC AMPLIFIER

(75) Inventors: Ci-Ling Pan, Hsinchu (TW); Jung Y. Huang, Hsinchu (TW); Jing-Yuan Zhang, Statesboro, GA (US); Chao-Kuei Lee, Kao-Hsung (TW)

(73) Assignee: National Chiao-Tung University, Hsinchu (TW)

( * ) Notice: Subject to any disclaimer, the term of this patent is extended or adjusted under 35 U.S.C. 154(b) by 114 days.

(21) Appl. No.: 10/926,654

(22) Filed: Aug. 25, 2004

(65) Prior Publication Data

US 2006/0044642 A1    Mar. 2, 2006

(51) Int. Cl.
*G02F 1/39* (2006.01)
(52) U.S. Cl. ........................... 359/330; 359/326
(58) Field of Classification Search ........ 359/326–332; 372/21–22
See application file for complete search history.

(56) References Cited

U.S. PATENT DOCUMENTS

| | | | | |
|---|---|---|---|---|
| 5,333,142 A | * | 7/1994 | Scheps | 372/22 |
| 5,408,481 A | * | 4/1995 | Scheps | 372/22 |
| 5,710,658 A | * | 1/1998 | Jacobson et al. | 359/328 |
| 5,936,739 A | * | 8/1999 | Cameron et al. | 356/441 |
| 6,900,928 B1 | * | 5/2005 | Lin et al. | 359/326 |
| 2004/0228372 A1 | * | 11/2004 | Vodopyanov et al. | 372/21 |

OTHER PUBLICATIONS

Marshall et al, "Continuously Tunable Diode-Pumped UV-Blue Laser Source", Optics Letters, vol. 18, No. 10, May 1993, pp. 817-819.*

Zimmermann et al, "All Solid State Laser Source For Tunable Blue and Ultraviolet Radiation", Applied Physics Letters, vol. 66, No. 18, May 1995, pp. 2318-2320.*

* cited by examiner

*Primary Examiner*—John D. Lee
(74) *Attorney, Agent, or Firm*—Perkins Coie LLP

(57) ABSTRACT

The present invention discloses a means of the generation of tunable femtosecond pulses from 380 nm to 465 nm near the degenerate point of a 405-nm pumped type-I BBO non-collinearly phase-matched optical parametric amplifier (NOPA). The tunable UV/blue radiation is obtained from sum frequency generation (SFG) between the OPA output and the residual fundamental beam at 810-nm and cascaded second harmonic generation (SHG) of OPA. With a pumping energy of 75 mJ at 405 nm, the optical conversion efficiency from the pump to the tunable SFG is more than 5% and the efficiency of SHG of the OPA is about 2%.

7 Claims, 3 Drawing Sheets

(a)

(b)

(a)

(b)

(a)

(b)

BLUE-LIGHT GENERATING FEMTOSECOND WAVELENGTH-TUNABLE NON-COLLINEAR OPTICAL PARAMETRIC AMPLIFIER

BACKGROUND OF THE INVENTION

1. Field of the Invention

The present invention relates to an optical parametric amplifier (OPA). In particular, the present invention relates to providing the blue light and the near-ultra-violet (380–460 nm) a continuously tunable optical parametric amplifier by using cascaded sum frequency generation of femtosecond non-collinear optical parametric amplifier.

2. Description of Relative Prior Art

In the near decade, the applications of the blue light become more important. The most important industry is high intensity storage. This wave length is very important for the application of bio-technology and environment control areas. Moreover, in the application of time-resolved and frequency-resolved studies, real time studies of molecular dynamical and optical spectrum studies, show that the development potential of the blue light and near-ultra-violet radiation. However, the source and the detector of the blue light and the near-ultra-violet light is still not enough. In the near decade, due to the development of non-linear crystal and laser technology is more come to mature, this makes possible of the tunable wave-length optical source of this wave-band. The trend is to generate a higher quality and convenient source and to increase the efficiency.

Optical parametric amplifier (OPA) is an important means to generate tunable-wavelength. But it is very difficult to generate blue light directly from the OPA. Generally, it needs to go through another non-linear optical process, such as frequency doubling or sum frequency generation, which increases the complexity and cost.

In the published documents, such as in the articles "ultra fast optical parametric amplifiers", Giolio cerallo et al., Review of scientific Instruments 74, 1–17(2003), relates to the generation of tunable wave-length optical source by OPA process; In the article "Generation and amplification of ultra-short shaped pulses in the visible by a two-stage non-collinear optical parametric process", Howe-Siang et al., Opt. Lett. 26, 1812–1814(2001); and "Broadband optical parametric amplification in the near UV-VIS", Tzankov et al., Opt. Commum., 2003, 107~(2002); "Broadband amplification of ultraviolet laser pulse", Osvay et al., Appl. Phys. B: Lasers Opt. B74, S163-2002(2002); emphasized by summing the frequency of the generating long wave-length. This makes the system more complex, and that summing frequency process itself also has time overlap problem, the output is not stable due to mechanical problem. In the article "Extension of tuning range of a femtosecond Ti: sapphire laser amplifier through cascaded second-order nonlinear frequency conversion process", Petro et al., J. Appl. Phys. 76, 7704–7712(1994); the designed architecture is based on the last stage of photo-frequency mixing or sum frequency generation, which is different from the article "Generation of femtosecond laser pulses tunable from 380 nm to 465 nm via cascaded nonlinear optical mixing in a non-collinear optical parametric amplifier with a type-1 phase matched BBO crystal", chao-Kuei lee et al., Opt Express 11,1702–1708 (2003), this article makes use of a cascaded non-linear Optical mixing to generate tunable-wavelength of femtosecond non-collinear optical parametric amplifier.

In the U.S. Pat. No.5,144,629 to basu ; U.S. Pat. No.5, 751,472 to jeys et.al., and U.S. Pat. No.5,769,513 to Stamm et.al., are implemented general optical parametric amplifier architecture, and only has signal and idler output.

The prior art of optical parametric amplifier with blue light out put basically is by using the output of generated long wave-length to generate the necessary short wave-length by sum-frequency, or by using high-order harmonic to generate excited light source of shorter wave-length. The disadvantage is that the wave length of the excited light source generation is not easy because of the transformed efficiency of high-order harmonic is low, group velocity mismatched, short wave-length thin-film deposition is not easy, and high cost. The last stage of optical mixing or sum-frequency architecture makes the system more complex, which is not convenient and limited in application consideration.

What is needed is an improved tunable wave-length femtosecond non-collinear optical parametric amplifier.

OBJECTS OF THE INVENTION

Therefore, it is an object of the invention to provide a femtosecond non-collinear optical parametric amplification to provide continuously tunable of blue light and green light generating device.

It is another object of the invention to provide a tunable wave-length femtosecond non-collinear optical amplifier by using cascaded non-linear optical crystal to provide a blue light source with wave band of 308–465 nm, and the wave-length is continuous tunable. It is yet another object of the invention to provide a tunable wave-length femtosecond non-collinear optical amplifier by using cascaded non-linear optical crystal to provide a blue light source with wave band of 308–465 nm, and the wave-length is continuous tunable.

It is yet another object of the invention to provide a tunable wave-length femtosecond non-collinear optical amplifier by using cascaded non-linear optical crystal, to implement a blue light parametric amplifier by lower cost and more simple method.

DISCLOSURE OF THE INVENTION

The present invention teaches a tunable wave-length femtosecond non-collinear optical sum-frequency generation, comprising: a frequency doubling device for generating optical parametric amplifier(OPA) excited light transmits to the $CaF_2$ window to generate a seeder; a rotating table, for capable the non-collinear parametric amplify crystal to rotate around the axis of the crystal; a plurality of lens, silver lens and reflector, to direct the light to a non-collinear optical parametric amplifier crystal; a crystal, for generating tunable wave-length of non-collinear optical parametric amplifier, the axis of the crystal may rotate amplifier, the axis and the wave-length of the cascaded sum frequency generation (SFG) can be tune.

BRIEF DESCRIPTION OF THE DRAWINGS

The foregoing and other advantages of the invention will be more fully understood with reference to the description of the best embodiment an I the drawings wherein.

DESCRIPTION OF THE PREFERRED EMBODIMENTS

Figure 1:
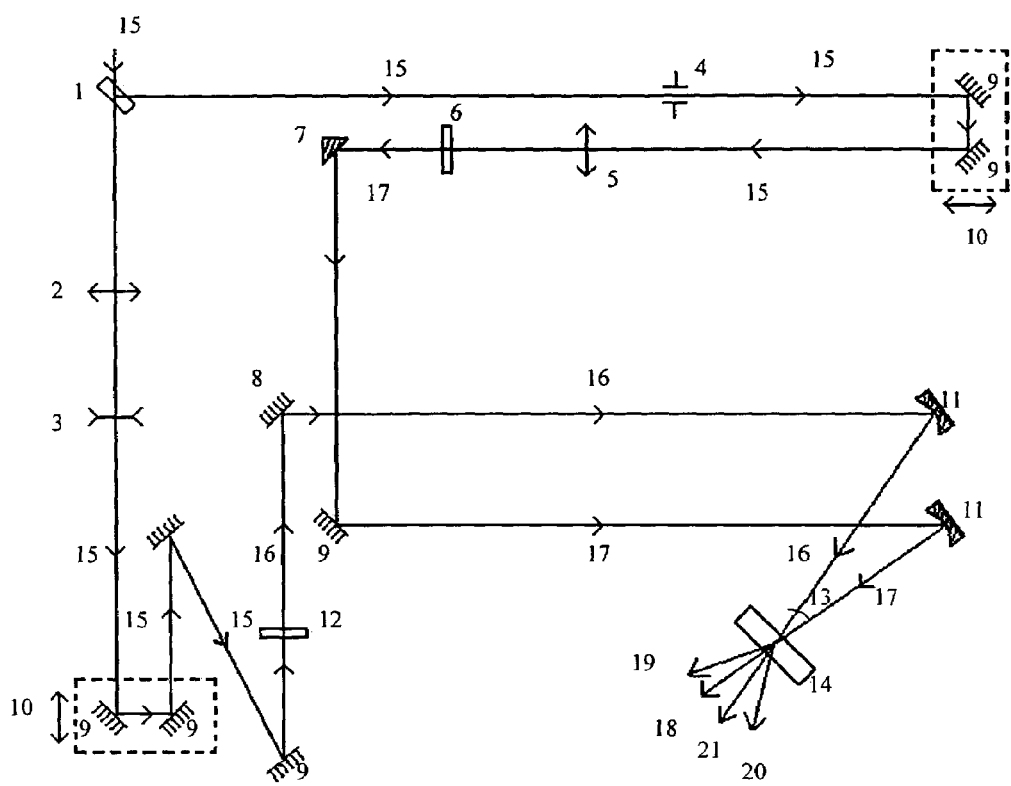
FIG. 1(a) is a schematic representation of the cascaded sum frequency optical parametric amplifier system 100 in according to one embodiment of the present invention.
FIG. 1(b) shows the propagation of the seeder for optical parametric generation (OPG).
Figure 1:
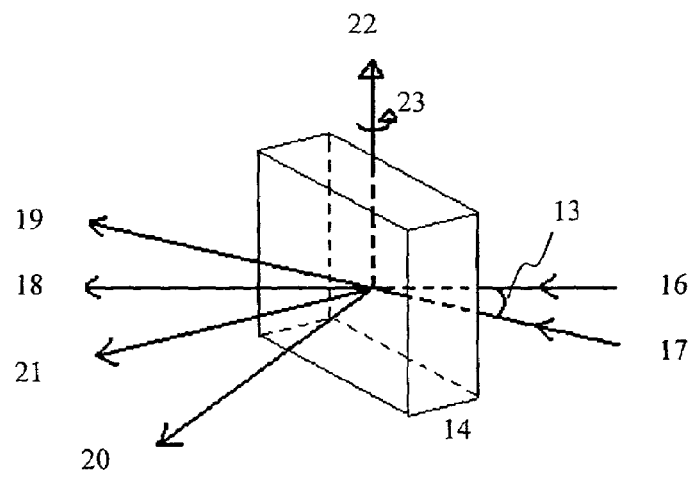

Referring to FIG. 1, FIG. 1(a) is a schematic representation of the cascaded sum frequency optical parametric amplifier system 100 in according to one embodiment of the present invention. The cascaded in according to sum frequency optical parametric amplifier of this embodiment includes a frequency doublers apparatus 12 for generating excitation light source 16, a low frequency seeder generating apparatus 15(not shown), a non-linear optical crystal 14 for generating tunable wave-length of non-collinear optical parametric amplifier, and some clamping for fixing sample, reflecting mirror, time delayed apparatus, and a rotating table for rotating the crystal (all of them is not shown), such that the crystal 14 may rotate around the axis 22, providing a crystal axis 22 to change the orientation of the crystal such that change the phase matching condition of the crystal.

When a Ti: sapphire laser; with output power larger than 1 mj/pulse and wave-length approximately 800 nm of infrared incident light 15 transmits to a 5/95 beam splitter 1, apart of approximately 5% reflects from the beam splitter go through the reflected light aperture 4, is reflected 180 degree by the two silver mirror 9, then focus by the 5 cm lens 5, generating a seeder light 17 by the window 6 of a CaF$_2$ with 2 mm thick, the seeder 17 is reflected by the parabolic reflector 7 with focal length of 5 cm, reflected by the silver mirror 9, and focused by the silver focus mirror with focus length 15 cm, then the seeder 17 is focused and go through a 2 mm thick BBO crystal for optical parametric amplification (OPA). On the other hand, most part of the incident light 15 go through the 5/95 beam splitter 1, then go through a tunable attenuator, i.e. a 30 cm convex lens 2 and a 15 cm concave lens 3, after adjust the focus length, then reflected 180 degree by two silver mirror 9 on the sliding table 10, and transmit through a 200 mm thick BBO crystal 12 for doubling the frequency. After doubling the frequency, it is a ~400 nm blue light 16. This second harmonic generation (SHG) is used for pumping non-collinear optical parametric amplification (NOPA). This blue light 16 is reflected by the blue light reflected mirror 8 and focused by the silver plating focus mirror 11 with focus length of 15 cm, then focusing on the 2 mm thick BBO crystal 14 for optical parametric amplification (OPA).

FIG. 1(b) shows the propagation of the seeder for optical parametric generation (OPG), the corresponding generated idler 20 will generate cascaded sum-frequency generation (SFG) 21 with the residue base frequency excitation light 19. The frequency of the sum frequency excitation light 19. The frequency of the sum frequency will be tunable changed with the direction change of the crystal axis 22 around the axis 23. This provides a continuous tunable blue light output of optical amplifier.

Figure 2:
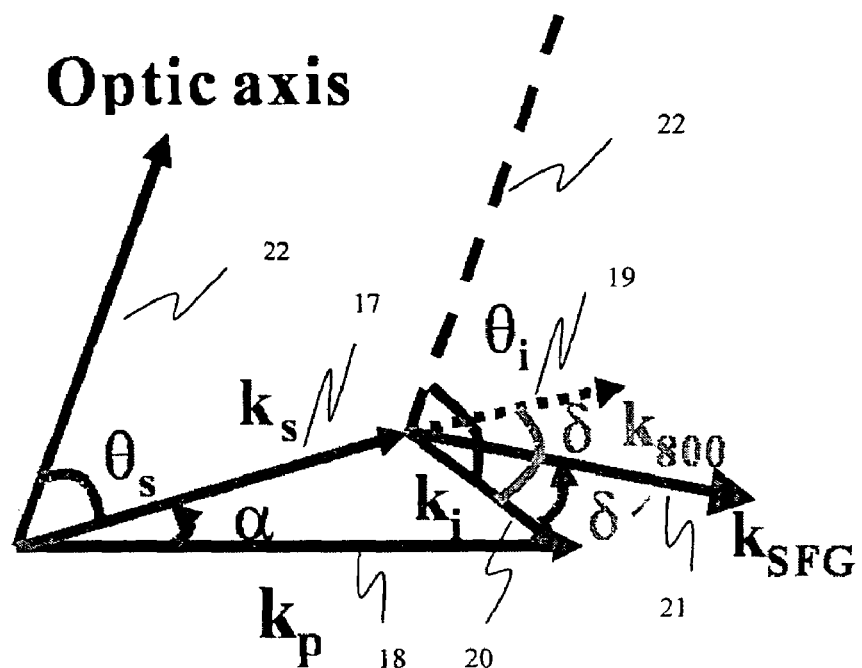
FIG. 2(a) is a schematic representation of the parametric amplification process and the optical axis corresponding to the cascaded sum frequency non-collinear optical parametric amplifier of FIG. 1.
FIG. 2(b) illustrates a graphical comparison of theoretical versus experimental data for the scheme of FIG. 2(a).
Figure 2:
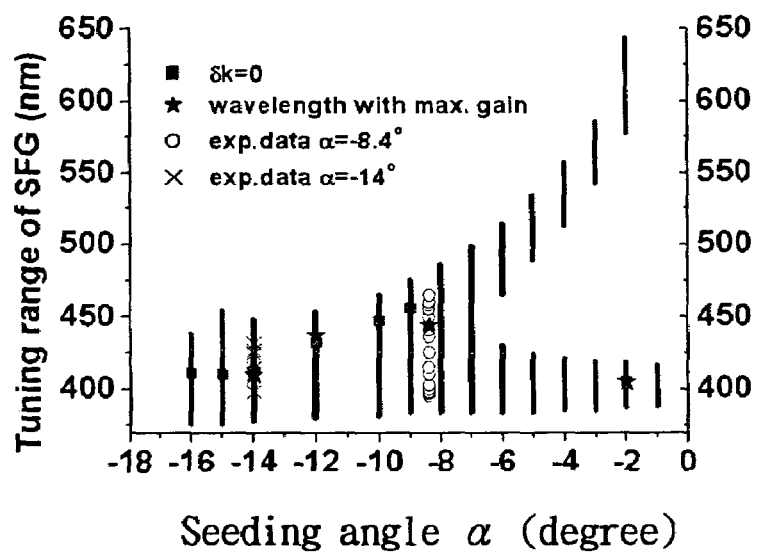

Referring to FIG. 2(a), FIG. 2(a) is a schematic representation of the parametric amplification process and the optical axis corresponding to the cascaded sum frequency non-collinear optical parametric amplifier of FIG. 1. wherein the definition of the symbols are as follow: $\theta_s$ is the angle between the optical axis 22 and the signal, $\theta_i$ is the angle between the optical axis 22 and the idler 20, respectively, $\alpha$ is the angle between the seeder 17 and the exited light 18 (the ultra fluorescent light), $\delta$ is the angle between the generated idler 20 and the residue base frequency excitation light 19 for generating white light, $\delta'$ is the angle between the corresponding sum frequency (SFG) 21 and the idler 20. As shown in FIG. 2(a), this architecture implements the exciting light 18 and the seeder 17 under a type 1 non-collinear architecture, and the angle $\alpha$ is negative, the idler 20 generated by the OPA will satisfy the condition of phase matching to generate sum frequency of the residue base frequency.

This embodiment has its corresponding modeling data, when cascaded sum frequency generation (SFG) occur, Energy conservation and phase matching of SFG can be cast into the form $$\begin{cases} \hbar\omega_{SFG} = \hbar\omega_i + \hbar\omega_{800} \\ \hbar\vec{k}_{SFG}^{(e)} = \hbar\vec{k}_i^{(o)} + \hbar\vec{k}_{800}^{(o)} \end{cases} \quad (1)$$

Where $\omega_{SFG}$, $\omega_i$, and $\omega_{800}$ are the frequencies of SFG, idler and base frequency respectively; $k_{SGF}$, $k_i$, and $k_{800}$ are the wave vectors of SFG, idler and base frequency respectively, the upper case of (e) and (o) polarization with respect to the optical axis, which perpendicular to the optical axis is o-ray, otherwise is e-ray. When Eq. 1 are both satisfied, $\delta'$ can be the form $$\delta' = \tan^{-1}\left(\frac{\vec{k}_{800}^{(o)}\sin\delta}{\vec{k}_{800}^{(o)}\cos\delta + \vec{k}_i^{(o)}}\right) \quad (2)$$

The theoretical calculated result is compared to the experiment data of the the above embodiment, please refer to FIG. 2(b), the vertical axis is the tuning range of SFG and the horizontal axis is the seeding angle $\alpha$ between the seeder and the OPA. The solid line is the calculated theoretical result of the SFG tuning range for different seeding angle $\alpha$, the solid square is the calculated wave length of optimum phase matching, the solid star is the experimental wave length where the energy transform results in maximum power output in that seeding angle, the open circle and the open cross is the tuning angle for seeding angle of −8.4 degree and −14 degree respectively. The experimental and the theoretical results are in good consistent. The wave length of the maximum power output efficiency is consistent with that of the theoretical optimum phase matching point. The tuning range in different seeding angles is also in the theoretical range, the experiment result and the theoretical value are also consistent.

Figure 3:
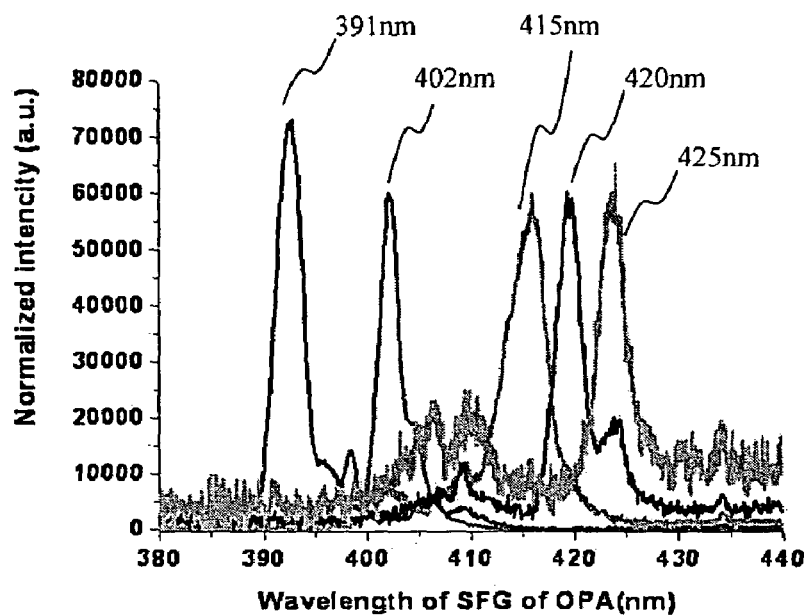
FIG. 3(a) is the spectrum of different sum frequency in the tuning range according to one embodiment of the present invention.
FIG. 3(b) is the spectrum of the double frequency generated by the idler in the architecture.
Figure 3:
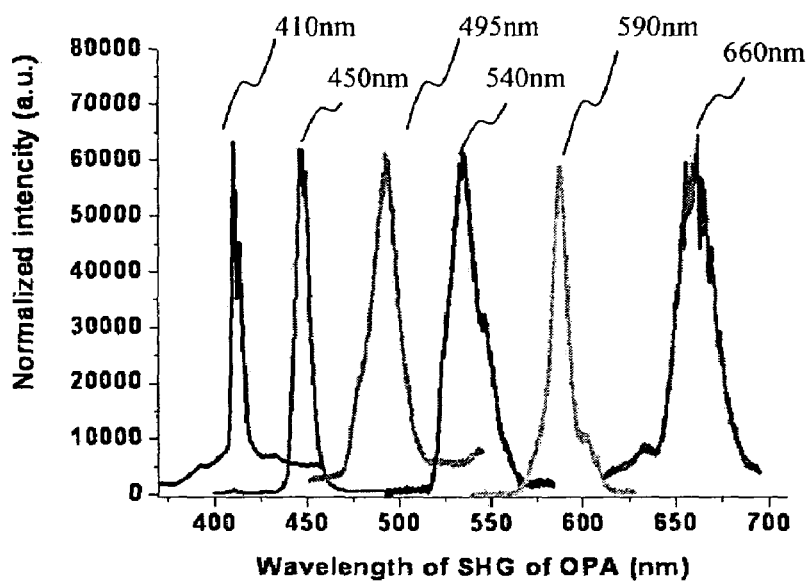

FIGS. 3(a) and (b) is the spectrum in the tuning range according to one embodiment of the present invention, this embodiment is the result for seeding angle of 8 degree. FIG. 3(a) is the result of different sum frequency and FIG. 3(b) is the spectrum of the double frequency generated by the idler in the architecture.

Although specific embodiments of the invention have been disclosed, the specification and drawings are, accordingly, to be regarded as an illustration rather than a restrictive sense. It will, however, be understood by those having skill in the art that minor changes can be made to the form and details of the specific embodiments disclosed herein, without departing from the spirit and the scope of the invention.

What is claimed is:

1. A cascaded nonlinear sum frequency generation of tunable wave-length femtosecomd non-collinear optical parametric amplifier (OPA), comprising:
    a frequency doubling device for generating an excited light source for the optical parametric amplifier(OPA), the incident light is transmitted to a doubling BBO crystal to be the double frequency of blue light;
    a low frequency seeder generating apparatus, the incident light is transmitted to a $CaF_2$ window to generate a seeder;
    a rotating table, for allowing a non-collinear optical parametric amplifier crystal to rotate around the axis of the crystal;
    a plurality of lens, silver lens and reflectors, to direct the light to a non-collinear optical parametric amplifier crystal;
    a crystal, for generating tunable wave-length of non-collinear optical parametric amplifier, the axis of the crystal may rotate around the rotating axis such that the wave-length of the cascaded sum frequency generation (SFG) can be tuned.

2. An optical parametric amplifier (OPA) as recited in claim 1, wherein the wave length of said incident light is near 800 nm of near infrared light.

3. An optical parametric amplifier (OPA) as recited in claim 1, wherein the wave length of said double frequency of blue light is near 400 nm.

4. An optical parametric amplifier (OPA) as recited in claim 1, wherein the thickness of the doubling BBO crystal is 100 μm to 300 μm.

5. An optical parametric amplifier (OPA) as recited in claim 1, wherein the thickness of said $CaF_2$ window is 1 mm to 3 mm.

6. An optical parametric amplifier (OPA) recited in claim 1, wherein the wave length of said tunable cascaded sum frequency generation (SFG) is 380 nm to 465 nm of blue light source.

7. An optical parametric amplifier (OPA) recited in claim 1, wherein n the seeding angle between said seeder and said excited light source is −8.4 degree to −14 degree.

* * * * *